C. C. FORBES, Jr.
GRAIN HEADING MACHINE.
APPLICATION FILED AUG. 9, 1915.
1,217,933.
Patented Mar. 6, 1917.
2 SHEETS—SHEET 1.
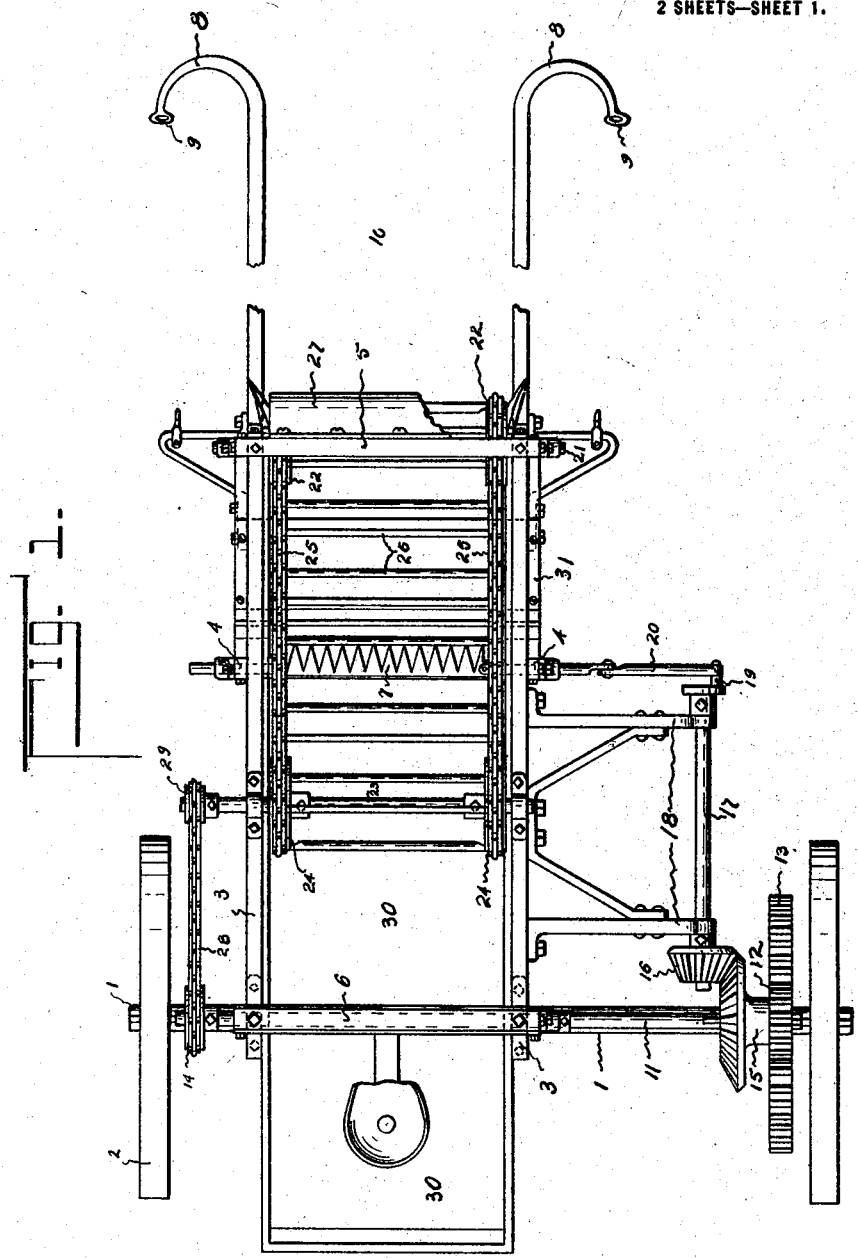
INVENTOR
C. C. Forbes, Jr.
BY
John M. Spellman
ATTORNEY C. C. FORBES, Jr.
GRAIN HEADING MACHINE.
APPLICATION FILED AUG. 9, 1915.
1,217,933.
Patented Mar. 6, 1917.
2 SHEETS—SHEET 2.
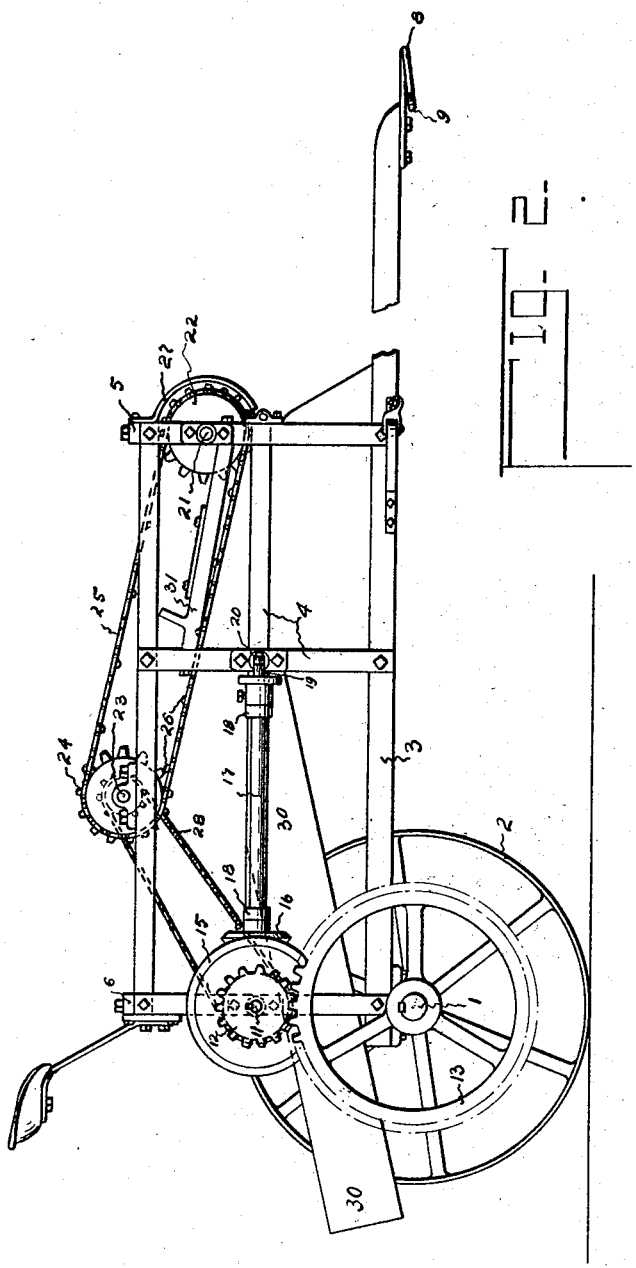
INVENTOR
C. C. Forbes, Jr.
BY
John M Spellman
ATTORNEY

UNITED STATES PATENT OFFICE.

CULLEN CURLEE FORBES, JR., OF CORPUS CHRISTI, TEXAS.

GRAIN-HEADING MACHINE.

1,217,933. Specification of Letters Patent. Patented Mar. 6, 1917.

Application filed August 9, 1915. Serial No. 44,394.

*To all whom it may concern:*

Be it known that I, CULLEN CURLEE FORBES, Jr., citizen of the United States, residing at Corpus Christi, in the county of Nueces and State of Texas, have invented certain new and useful Improvements in Grain-Heading Machines, of which the following is a specification.

My invention has relation to a machine for harvesting Kafir corn or the like and in such connection it relates more particularly to the means and mechanism for guiding and presenting the heads of grain, whether the grain be uniform in height or not, to the reciprocatory cutter bar of the machine.

In the carrying out of my invention there is provided a vehicle adapted to be drawn through the grain, the frame work of the vehicle serving as a means to guide the grain to the mechanism for supporting and for cutting off the heads of the grain, which mechanism is supported by the frame work and is operated directly from the axle of the vehicle.

The principal objects of my invention are first to provide a simple and efficient mechanism for guiding and presenting the heads of the grain to the knives, said mechanism arranged to properly support the heads during the cutting operation and to properly guide the grain whether the heads be uniform in height above the ground or not: second to provide in a grain heading machine, a guiding and supporting reel consisting of two endless chains connected transversely by slats and traveling in a plane at an angle to the cutter bar, the lower or return portion of the endless apron forming said reel receiving the grain heads and coöperating with the cutter bar—said portion of the reel traveling toward the cutters and upwardly away from the same.

The nature and scope of my invention will be more fully understood from the following description taken in connection with the accompanying drawings forming part hereof, in which:

Figure 1, is a top or plan view of a grain heading machine embodying the main features of my invention, and Fig. 2, is a side elevational view thereof with the near wheel removed.

Referring to the drawings, 1 represents the axle and 2 the wheels fastened thereto to revolve or rotate the axle as the machine or vehicle is drawn through the field. On the axle 1, are supported the longitudinal beams 3 constituting with the sides 4 and front end cross pieces 5 and rear end cross pieces 6 a cart like frame work, supporting the cutter bar 7 and the various operative parts of the machine.

The beams 3 terminate at their forward ends in the outwardly curved goose necks 8 to the outside hooks 9 of which the horses or driving power for the machine are attached. The beams 3 thus have at their forward ends an opening or space 10 into which the grain is guided by the goose necks 8. In the rear end frame 6 parallel with the axle 1 is supported a shaft 11 having at one end a pinion 12 in mesh with a gear wheel 13 keyed to the axle 1 and at the other end a sprocket wheel 14. The shaft 11 also carries preferably near the pinion 12, a miter gear 15 meshing with the miter gear 16 on the end of a shaft 17 arranged at right angles to shaft 11. This longitudinally arranged shaft 17 is supported by and has its bearings in a bracket or frame work 18 projecting horizontally from the sides 4 of the main frame of the vehicle. The shaft 17 has a crank arm 19 connected by link 20 with the cutter bar 7 and is adapted when it turns to reciprocate the cutter bar 7.

In the front end 5 of the frame of the vehicle and below the top of said front end is supported a transversely arranged shaft 21 having at either end a sprocket wheel 22 and on top of the frame of the vehicle near the rear end 6 thereof is also supported a shaft 23 having at either end a sprocket wheel 24. Corresponding sprockets 22 and 24 are connected by chains 25 and the two chains 25 are connected by the cross slats 26, the chains and slats forming an open work endless apron or reel.

The forward sprockets 22 and apron passing over the same are shielded or partly inclosed by the fender or guide 27 which serves to prevent the grain entering the chains, sprocket wheels or apron and guides the grain into the spaces between slats 26 on the under or return portion of the reel or apron.

The shaft 23 carrying the sprockets 24 is rotated by a chain 28 connecting a sprocket 29 on the end of shaft 23 with the sprocket 14 of the shaft 11.

From below the cutter bar 7 extends to the rear of the machine a trough or chute 30 into which the grain heads drop after being cut off and from which the heads are delivered to bags, boxes or other receptacles desired.

Between the upper and lower faces of the apron or reel extends a deflecting board 31 arranged just in front and above the cutter bar 7 and projecting angularly thereto. This board 31 serves to bend down the heads during the cutting operation so that the heads will be cut off at approximately the same distance from the top end and also serves with the return portion of the reel to convey the heads into the chute 30.

In operation the machine is drawn by suitable power, preferably horses, through the field and a portion of the grain enters the space 10 and is presented first to the fender or guide 27 where the heads are bent forward. As the machine continues to move the heads spring under the fender 27 into the open spaces between slats 26 on the under or return surface of the reel or apron. This portion of the reel or apron is traveling toward the cutter bar 7 and carries the heads rearwardly until they contact with and are depressed by the board 31 and the cutter bar 7 is permitted to shear the head off. The apron in traveling toward the rear of the machine receives the heads depressed by the board 31 and cut by the bar 7 and conveys the same to the chute 30.

Having thus described the nature and objects of my invention what I claim as new and desire to secure by Letters Patent, is—

1. In a machine of the character described, a frame work, a cutter bar operating transversely of the frame work and supported thereby, a shaft and sprockets arranged at the front end of the frame work, a second shaft and sprockets arranged in the frame work above the first shaft and sprockets and to the rear of the cutter bar, chains driven by said sprockets, and cross slats connecting said chains to form an endless slotted apron, a means for driving the apron so that its under face travels rearwardly in the frame work toward the cutter bar, and an inclined board arranged above the under face of the apron and extending from the front of the machine to the cutter bar.

2. In a machine of the character described, a framework, an endless, slotted apron arranged to revolve in an inclined position in the frame work, the under face of the apron traveling to the rear and upward in the machine, a cutter bar reciprocating in the frame work below the under face of the apron and intermediate of its ends, a deflector board extending from a point above the cutter bar to the front end of the apron, said board extending within the apron above its under face, and a fender and guide partly inclosing the forward end of said apron.

In testimony whereof I have signed my name to this specification.

CULLEN CURLEE FORBES, Jr.

Copies of this patent may be obtained for five cents each, by addressing the "Commissioner of Patents, Washington, D. C."